US008261255B1

(12) United States Patent
Spiegel

(10) Patent No.: US 8,261,255 B1
(45) Date of Patent: Sep. 4, 2012

(54) METHOD, SYSTEM, AND COMPUTER PROGRAM PRODUCT FOR MAINTAINING SOFTWARE ON A COMPUTER SYSTEM WITH AUTOMATIC DEPENDENCY RESOLUTION

(75) Inventor: David N. Spiegel, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 2118 days.

(21) Appl. No.: 09/708,129

(22) Filed: Nov. 7, 2000

(51) Int. Cl.
*G06F 9/44* (2006.01)
*G06F 9/445* (2006.01)
*G06F 17/30* (2006.01)

(52) U.S. Cl. ......... 717/170; 717/169; 717/175; 707/705

(58) Field of Classification Search .................. 717/169, 717/170, 120–123; 707/203
See application file for complete search history.

(56) References Cited

U.S. PATENT DOCUMENTS

| | | | | |
|---|---|---|---|---|
| 5,493,682 A | | 2/1996 | Tyra et al. ..................... | 395/700 |
| 5,574,905 A | | 11/1996 | deCarmo ...................... | 395/601 |
| 5,617,533 A | * | 4/1997 | Wu et al. ......................... | 714/38 |
| 5,721,824 A | * | 2/1998 | Taylor ........................... | 709/203 |
| 5,805,891 A | | 9/1998 | Bizuneh et al. ............... | 395/704 |
| 5,805,897 A | | 9/1998 | Glowny ........................ | 395/712 |
| 5,835,777 A | * | 11/1998 | Staelin .......................... | 717/175 |
| 5,835,911 A | | 11/1998 | Nakagawa et al. ........... | 707/203 |
| 5,859,977 A | * | 1/1999 | Nishiyama et al. ........... | 709/223 |
| 5,933,646 A | * | 8/1999 | Hendrickson et al. ........ | 717/169 |
| 5,960,189 A | * | 9/1999 | Stupek et al. ................. | 717/169 |
| 6,029,258 A | | 2/2000 | Ahmad .......................... | 714/46 |
| 6,381,742 B2 | * | 4/2002 | Forbes et al. ................. | 717/176 |

FOREIGN PATENT DOCUMENTS

JP 3237530 2/1990

OTHER PUBLICATIONS

J.A. Gowan, C. Jesse, and R.G. Mathieu, "Y2K Compliance and the Distributed Enterprise", Feb. 1999, Communications o the ACM, vol. 42, No. 2, pp. 68-73.*
Jim Boyle et al., "IMS/ESA Sysplex Data Sharing: An Implementation Case Study", Aug. 1997, IBM Corporation, IBM Redbooks, pp. 31 and 32.*
"SMP/E R8.1 Primer", 1995, IBM Product Documentation, Doc. No. GC23-3771-01, accessed and printed online on Sep. 1, 2005 at <http://www-1.ibm.com/support/docview.wss?uid=pub1gc23377101>.*
"Scrollable Lists for Applications Automation Edition Software," IBM Technical Disclosure Bulletin vol. 37, No. 6A, Jun. 1994, pp. 343-344.

* cited by examiner

*Primary Examiner* — James D Rutten
(74) *Attorney, Agent, or Firm* — Hoffman Warnick LLC; John R. Pivnichny

(57) ABSTRACT

Software is maintained on a computer system. A software recording application having data on maintenance items already installed on the computer system is started in a host session. A database application is started in a second host session. The database application has a database of maintenance items which can be applied. Each item in the database includes prerequisite and corequisite items. A maintenance application is activated on the computer system and a list of maintenance items to be installed on the computer system is entered. The database is searched for prerequisite and corequisite items for each item on the entered list and those items are added to the list. Items on the list which have already been received are determined from the software recording application and those items not received are added to an order list. Items on the order list are ordered, received, and applied to the computer system.

19 Claims, 2 Drawing Sheets

METHOD, SYSTEM, AND COMPUTER PROGRAM PRODUCT FOR MAINTAINING SOFTWARE ON A COMPUTER SYSTEM WITH AUTOMATIC DEPENDENCY RESOLUTION

TECHNICAL FIELD

The invention relates to maintaining software on a computer system and particularly to methods and systems for determining which maintenance items are already installed on a system, which items need to be added and insuring that prerequisite and corequisite items are appropriately handled.

BACKGROUND OF THE INVENTION

Computer systems of all types require periodic and sometimes unexpected or unplanned software maintenance. This applies to personal computers of all types e.g. portables and desktops as well as servers, and mainframes. When the computer system is large, expensive, or serving many users, the maintenance operations must necessarily be performed quickly and efficiently to minimize disruption of service and possible loss of revenue due to the computer system being unavailable during the planned or unplanned maintenance operation. Furthermore, a large system may have a large number of software items which were installed over a long period of time each one having different maintenance levels. Each item may also have various prerequisite items which must be installed or removed prior to installing that particular item or corequisite items which must be installed or removed during the same session or previously.
Software maintenance items may be distributed in portable media such as magnetic tapes, floppy disks, CD roms, or they may be distributed over a network or other communication channels including the internet, dial-up through a telephone service, via fiber optic cable, or other data channels known in the art.

Performing software maintenance on computer systems, particularly large systems is therefore a complicated and difficult procedure, prone to errors which can disable a valuable resource for periods much larger than can reasonable be planned. A number of solutions have been developed, however, none have be found to be completely satisfactory for addressing the problems described above.

For example, Tyra et al. in U.S. Pat. No. 5,493,682, incorporated herein by reference, describe a system for software maintenance based on object oriented programming concepts. However a considerable amount of definition is needed for events required to maintain a software object including event identifiers and event conditions; object definitions including object identifier, attributes, and methods to be performed; and dependency objects. Software already installed on many systems may not have such definitions so that creation of such definition may be a prohibitively burdensome task in order to use Tyra's maintenance system.

Bizuneh et al. in U.S. Pat. No. 5,805,891 describe a system for distributing a software maintenance module by first verifying and testing the module prior to distributing it to the end users.

Glowny et al. in U.S. Pat. No. 5,805,897 describe a system for installing software on a remote workstation in a network having a plurality of workstations including a local workstation. Installation at the remote workstation is initiated and controlled from the local workstation by communicating over the network.

Nakagawa et al. in U.S. Pat. No. 5,835,911 describe a software distribution and maintenance method using a plurality of user computers and a vendor computer having a software library. A user computer sends an inquiry over the network to the vendor computer for the latest configuration of an object software. The inquiry may be made periodically or in response to a user initiating the software. The vendor computer receives the inquiry and generates update instruction information about the latest version in the software library. The instruction information and a copy of the latest version object software are returned to the user computer via the network where the instruction information is processed to update the object software. Processing may include compiling and linking if necessary.

Nishiyama et al. in U.S. Pat. No. 5,859,977 describe a network system having both a processing network and a separate maintenance network having high reliability and high responsiveness. All software maintenance is carried out using the maintenance network thereby providing an overall system with high reliability and expendability.

Ahmad in U.S. Pat. No. 6,029,258 describes trouble shooting software for a software application. A user launches the trouble shooting software when encountering a problem with the application. The trouble shooter attempts to find a problem solution in an information store of problem solutions. If located, the solution is passed to the user to install. If no solution is found the trouble shooter connects to an internet trouble shooting site and server to obtain additional solutions. If no solution is found there, the trouble shooting software then recommends that the provider of the application be contacted about the problem.

deCarmo in U.S. Pat. No. 5,574,905 describes a method of editing a multimedia file having segments located in different data files, through use of a linked-list structure. Some editing operations therefore result in changes to the linked-list structure rather than the file itself, avoiding making file copies.

Kiichi in Japanese Patent JP3237530 describes a system for distributing software updates. An update object list file is received by a personal computer from a host computer. The personal computer then successively receives files of all update modules based on this object list file and updates its software.

Despite the aforementioned developments there remains a need for an improved software maintenance process.

OBJECTS AND SUMMARY OF THE INVENTION

It is therefore a principal object of the present invention to enhance the software maintenance art by providing a method of maintaining software on a computer system with enhanced capabilities.

It is another object to provide a system for maintaining such software wherein enhanced capabilities are possible.

It is yet another object to provide a computer system for maintaining software which can be applied in a facile manner.

It is a further object to provide a computer program product with enhanced capability to facilitate maintaining software.

These and other objects are attained in accordance with one embodiment of the invention wherein there is provided a method of maintaining software on a computer system, comprising the steps of, bringing up first and second host sessions on a computer system, starting in the first host session, a software recording application having data on first maintenance items applied to the computer system, starting in the second host session, a database application having a database of second maintenance items including prerequisite items and corequisite items corresponding to each of the second maintenance items, activating a maintenance application on the computer system, entering a first list of third maintenance items in the maintenance application, searching the database for the prerequisite items and corequisite items corresponding to each of the third maintenance items on the first list, and adding the corresponding prerequisite items and corequisite items to the first list, thereafter determining from the software recording application which items on the first list have already been received, and adding those items not received to an order list, and ordering, receiving, and applying the items on the order list.

In accordance with another embodiment of the invention, there is provided a system for maintaining software on a computer system, comprising, means for bringing up first and second host sessions on a computer system, a software recording application having data on first maintenance items applied to the computer system, a database application having a database of second maintenance items including prerequisite items and corequisite items corresponding to each of the second maintenance items, a maintenance application having a first list of third maintenance items, means for searching the database for the prerequisite items and corequisite items corresponding to each of the third maintenance items on the first list, and adding the corresponding prerequisite items and corequisite items to the first list, means for thereafter determining from the software recording application which items on the first list have already been received, and adding those items not received to an order list, and means for ordering, receiving, and applying the items on the order list.

BEST MODE FOR CARRYING OUT THE INVENTION

Figure 1:
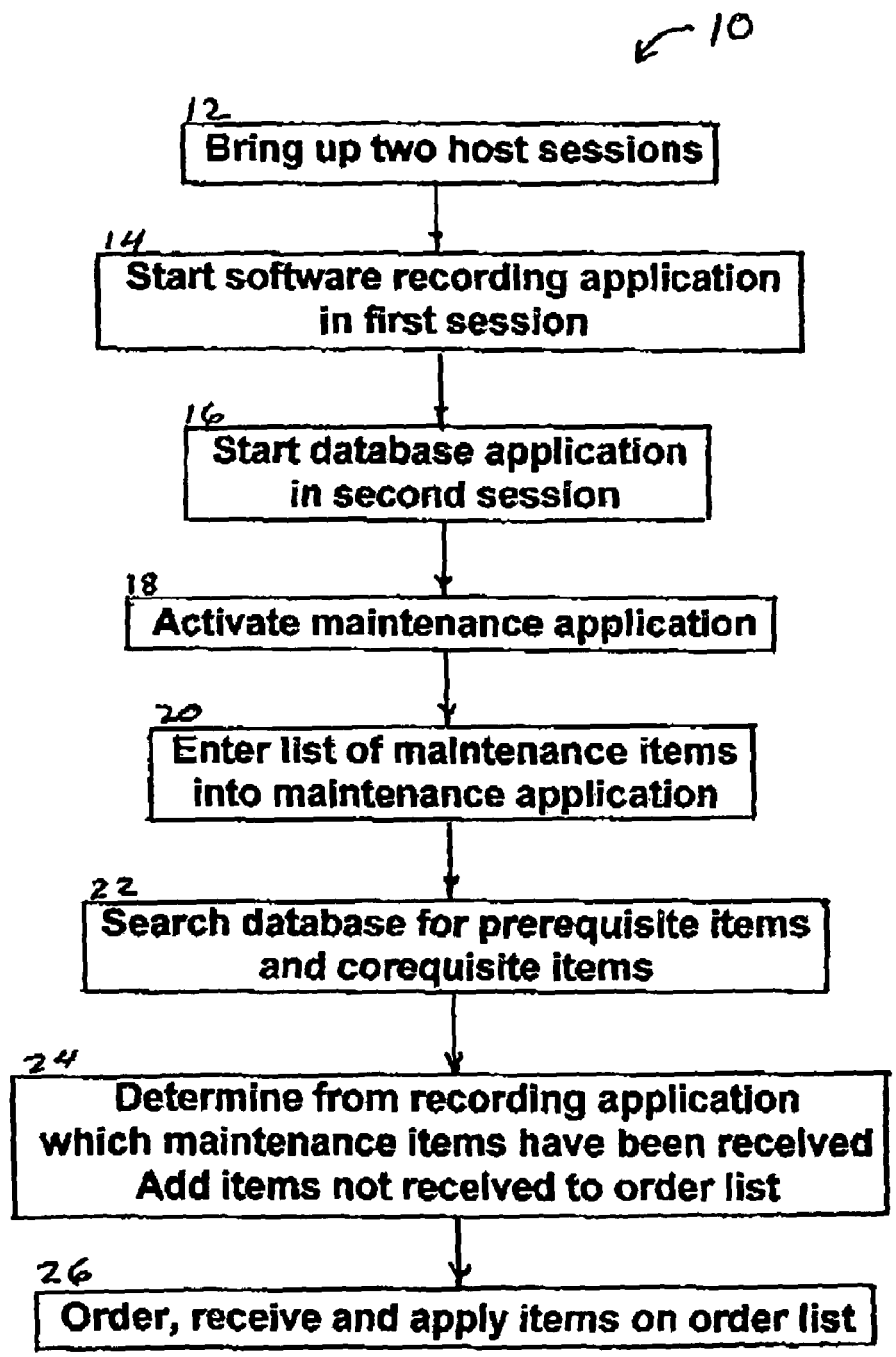
FIG. 1 is a flowchart in accordance with one embodiment of the invention.

For a better understanding of the present invention, together with other and further objects, advantages and capabilities thereof, reference is made to the following disclosure and the appended claims in connection with the above-described drawing.

In the Figure there is shown a flowchart 10 of a method for software maintenance in accordance with the present invention. In step 12 two host sessions are brought up on a computer system. The computer system is normally the computer system on which one wants to perform software maintenance, however this is not required in order to practice the invention. The computer system may be a mainframe, personal computer, laptop, portable or any other type of computer system on which it is desired to perform software maintenance. The computer system may further include an operating system such as an OS/390 architecture operating system and may also include associated software program products such as JESx and networking software. The computer system may also include a data terminal and a supporting software such as an IBM program called Personal Communication/3270. The computer system is capable of bringing up host sessions such as may be provided by its operating system software or by some other software installed on the computer system.

In step 14 a software recording application is brought up in a first session. The recording application has data on first maintenance items which have been applied to the computer system in the past. One example of such a recording application is a program provided by IBM Corp. known as SMP/E. This program can record what software has been put on, track such software, record what software has been taken off, and record what software has been cloned, all on an OS/390 architecture system. The software recording application includes software for determining whether any particular maintenance item has already been received by the computer system.

In step 16 a database application is started in the second session. The database application has a database of second maintenance items known as PTF's The database also includes a listing of prerequisite and corequisite items for each second maintenance item. The database may also include descriptions known as APARS, of known problems in software items and mention of known fixes. One example of such a database application is an IBM program called Service Link. The database application includes a capability for searching the database of second maintenance items.

In step 18 a maintenance application is activated on the computer system. The maintenance application may be written in the REXX language and run in a window on the computer system. In step 20 a first list of third maintenance items are entered into the maintenance application. This list may be a list of maintenance items needed to be put on to the computer system. The list may be entered via keyboard, importing a file, selecting from some other list, or any other method known in the art for entering a list into an application.

In step 22 the database of the database application started in step 16 is searched for prerequisite items and corequisite items corresponding to each maintenance item on the list entered in step 20. The prerequisite and corequisite items found in this searching are added to this list. Any particular item may therefore appear multiple times on the list. Such duplicates may be determined and removed to improve efficiency of the method, although this is not required by the scope of the invention.

In step 24 it is determined from the software recording application stated in step 14, which items on the list have already been received and those not received are added to an order list. Received shall be taken to mean stored in a file on the computer system. The item may have been stored in a file when the computer system was originally provided by the computer manufacturer. It may have been stored as a result of an earlier use of the present method, or as a result of some other maintenance procedure, or a file may have been provided in any other way known in the art for providing a file.

In step 26, the items on the order list are ordered, received, and applied. Applied shall mean that a received item has been installed on the computer system or updated an earlier installed version of the item on the computer system. Ordering may be performed using the maintenance application activated in step 18, however, other methods of ordering maintenance software may also be used.

Figure 2:
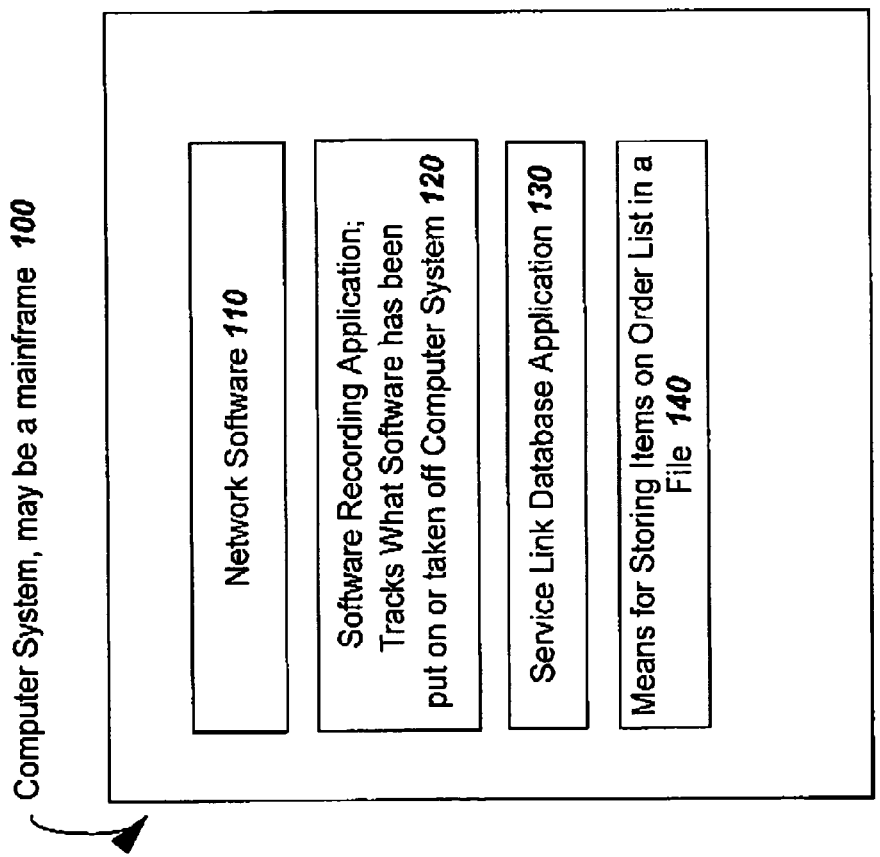
FIG. 2 shows a block diagram of a computer system according to one embodiment of the invention.

FIG. 2 shows a block diagram of a computer system 100 according to one embodiment of the invention. As illustrated in the figure, computer system 100 may be a mainframe. Computer system 100 may have network software 110. Computer system 100 may also have a software tracking application that tracks what software has been put on or taken off computer system 120. Computer system 100 may also have a Service Link database application 130. Computer system 100 may also have a means for storing items on order list in a file 140.

While there have been shown and described what are at present considered the preferred embodiments of the invention, it will be obvious to those skilled in the art that various changes and modifications may be made therein without departing from the scope of the invention as defined by the appended claims.

What is claimed is:

1. A method of maintaining software on a computer system, comprising the steps of:
   bringing up first and second host sessions on a computer system;
   starting in said first host session, a software recording application having data on existing first maintenance items that have been previously applied to said computer system;
   starting in said second host session, a database application having a database of second maintenance items that are known as being able to be installed on the computer system, and prerequisite items and corequisite items corresponding to each of said known second maintenance items;
   activating a maintenance application on said computer system;
   entering a first list of new third maintenance items in said maintenance application;
   searching said database of known second maintenance items for records matching each of said new third maintenance items to find records that have said prerequisite items and corequisite items and adding said corresponding prerequisite items and corequisite items to said first list;
   thereafter determining from said software recording application which items on said first list have already been received, and adding those items not received to an order list; and
   thereafter ordering, receiving, and applying said items on said order list.

2. The method of claim 1, wherein said computer system is a mainframe.

3. The method of claim 1, wherein said computer system further comprises an operating system.

4. The method of claim 3, wherein said computer system further comprises network software.

5. The method of claim 1, wherein said software recording application tracks what software has been put on or taken off said computer system.

6. The method of claim 1, wherein said database application is Service Link.

7. The method of claim 1, wherein said receiving step further comprises storing said items on said order list in a file on said computer system.

8. The method of claim 1, wherein said applying step further comprises updating said software on said computer system with said items on said order list.

9. A system for maintaining software on a computer system, comprising:
   means for bringing up first and second host sessions on a computer system;
   a software recording application having data on existing first maintenance items previously applied to said computer system;
   a database application having a database of second maintenance items that are known as being able to be installed on the computer system, and prerequisite items and corequisite items corresponding to each of said known second maintenance items;
   a maintenance application having a first list of new third maintenance items, wherein the first list comprises a list of maintenance items needed to be applied to said computer system;
   means for searching said database of known second maintenance items for records matching each of said new third maintenance items to find records that have said prerequisite items and corequisite items and adding said corresponding prerequisite items and corequisite items to said first list;
   means for thereafter determining from said software recording application which items on said first list have already been received, and adding those items not received to an order list; and
   means for thereafter ordering, receiving, and applying said items on said order list.

10. The system of claim 9, wherein said computer system is a mainframe.

11. The system of claim 9, wherein said computer system further comprises an operating system.

12. The system of claim 9, wherein said computer system further comprises network software.

13. The system of claim 9, wherein said recording application tracks what software has been put on or taken off said computer system.

14. The system of claim 9, wherein said database application is Service Link.

15. The system of claim 9, further comprising means for storing said items on said order list in a file on said computer system.

16. The system of claim 9, further comprising means for updating said software on said computer system with said items on said order list.

17. A computer system for maintaining software, said system comprising:
   means for bringing up first and second host sessions on a computer system;
   means for starting in said first host session, a software recording application having data on existing first maintenance items previously applied to said computer system;
   means for starting in said second host session, a database application having a database of second maintenance items that are known as being able to be installed on the computer system, and prerequisite items and corequisite items corresponding to each of said known second maintenance items;
   means for activating a maintenance application on said computer system;
   means for entering a first list of new third maintenance items in said maintenance application;
   means for searching said database of known second maintenance items for records matching each of said new third maintenance items to find records that have said prerequisite items and corequisite items and adding said corresponding prerequisite items and corequisite items to said first list;
   means for thereafter determining from said software recording application which items on said first list have already been received, and adding those items not received to an order list; and
   means for thereafter ordering, receiving, and applying said items on said order list.

18. A computer program product for instructing a processor to maintain software, said computer program product comprising:
   a computer readable medium;
   program instruction means for bringing up first and second host sessions on a computer system;

program instruction means for starting in said first host session, a software recording application having data on existing first maintenance items previously applied to said computer system;

program instruction means for starting in said second host session, a database application having a database of second maintenance items that are known as being able to be installed on the computer system, and prerequisite items and corequisite items corresponding to each of said known second maintenance items;

program instruction means for activating a maintenance application on said computer system;

program instruction means for entering a first list of new third maintenance items in said maintenance application;

program instruction means for searching said database of known second maintenance items for records matching each of said new third maintenance items to find records that have said prerequisite items and corequisite items and adding said corresponding prerequisite items and corequisite items to said first list;

program instruction means for thereafter determining from said software recording application which items on said first list have already been received, and adding those items not received to an order list; and program instruction means for thereafter ordering, receiving, and applying said items on said order list; and wherein all said program instruction means are recorded on said medium.

19. A method for maintaining software on a computer system, the method comprising:

bringing up in a first session on the computer system a recording application for recording what software has been put on the computer system, tracking what software has been put on the computer system, recording what software has been taken off the computer system, and recording what software has been cloned;

recording by the recording application whether a first maintenance item has been received by the computer system, the first maintenance item having been received if the first maintenance item has been stored in a file on the computer system;

starting in a first session on the computer system a database application having a searchable database of second maintenance items that are known as being able to be installed on the computer system, and corresponding prerequisite items, corequisite items, descriptions of known problems, and mentions of known fixes;

activating a maintenance application on the computer system;

entering into the maintenance application a list of third maintenance items needed to be put on to the computer system;

searching for each third maintenance item in the list of the database of known second maintenance items to find records that have prerequisite items and corequisite items that correspond to a third maintenance item;

adding any found prerequisite and any found corequisite items from the searching step to the list;

comparing each member of the list to recorded first maintenance items to determine which members of the list have not been received, not received members having not been found in the recorded first maintenance items;

storing in an order list the results of the comparing step;

ordering using the maintenance application all members in the order list; receiving received items as a result of the ordering step; and applying the received items by at least one of installing a received item and updating an earlier version with the received item.

* * * * *